(12) United States Patent
Scothern

(10) Patent No.: US 11,407,517 B2
(45) Date of Patent: Aug. 9, 2022

(54) HYBRID AIRCRAFT PROPULSION SYSTEM

(71) Applicant: ROLLS-ROYCE plc, London (GB)

(72) Inventor: David P Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/394,280

(22) Filed: Apr. 25, 2019

(65) Prior Publication Data

US 2019/0344898 A1     Nov. 14, 2019

(30) Foreign Application Priority Data

May 14, 2018    (GB) ...................................... 1807774

(51) Int. Cl.
     *B64D 27/12*      (2006.01)
     *B64D 27/24*      (2006.01)
     (Continued)

(52) U.S. Cl.
     CPC ............. *B64D 27/12* (2013.01); *B64D 27/24* (2013.01); *F01D 15/10* (2013.01); *F02C 6/20* (2013.01);
     (Continued)

(58) Field of Classification Search
     CPC ..... F02C 6/20; F02C 7/32; F02C 7/36; B64D 27/10; B64D 27/12; B64D 27/24; B64D 41/00; B64D 2027/026; F05D 2270/053; F05D 2270/061; F05D 2270/301; F05D 2220/50; F05D 2220/76; F01D 15/10
     See application file for complete search history.

(56) References Cited

U.S. PATENT DOCUMENTS 4,021,142 A * 5/1977 Violette .................... F02C 7/36
                                                    416/167
6,672,075 B1 * 1/2004 Sandu ..................... F01D 5/088
                                                    415/114
(Continued)

FOREIGN PATENT DOCUMENTS

EP        2581308        4/2013
EP        3093235       11/2016
(Continued)

OTHER PUBLICATIONS

Kurzke, "Fundamental Differences Between Conventional and Geared Turbofans" (2009), ASME, GT2009-59745 (Year: 2009).*

(Continued)

*Primary Examiner* — Jason H Duger
(74) *Attorney, Agent, or Firm* — Shumaker & Sieffert, P.A.

(57) ABSTRACT

A hybrid aircraft propulsion system. The system comprises a gas turbine engine comprising a compressor, a combustor, one or more turbines, a shaft coupled to one of the turbines, and a bypass fan mechanically driven by the shaft. The system further comprises an electrical generator mechanically coupled to the shaft, and an auxiliary propulsor mechanically coupled to an electric motor and electrically coupled to the electric generator. At maximum power, the gas turbine engine is configured to produce a turbine entry temperature at maximum power between 1800 Kelvin and 2000 Kelvin, the engine comprises a fan bypass ratio of between 4:1 and 13:1, and the generator is configured to absorb between 10% and 60% of the mechanical power generated by the turbine.

7 Claims, 3 Drawing Sheets

(51) Int. Cl.
  *F01D 15/10* (2006.01)
  *F02C 6/20* (2006.01)
  *B64D 27/02* (2006.01)

(52) U.S. Cl.
  CPC .... *B64D 2027/026* (2013.01); *F05D 2220/76* (2013.01)

(56) References Cited

U.S. PATENT DOCUMENTS

| | | | |
|---|---|---|---|
| 2015/0191252 A1* | 7/2015 | Cline | B64D 31/12 60/39.24 |
| 2016/0003049 A1* | 1/2016 | Baltas | F01D 5/141 416/223 A |
| 2016/0214727 A1* | 7/2016 | Hamel | B64C 21/06 |
| 2017/0363094 A1* | 12/2017 | Kumar | F04D 27/002 |
| 2018/0127089 A1 | 5/2018 | Welstead et al. | |
| 2018/0230912 A1* | 8/2018 | Hasel | F01D 5/12 |

FOREIGN PATENT DOCUMENTS

| | | |
|---|---|---|
| EP | 3144216 A1 | 3/2017 |
| EP | 3184789 | 6/2017 |

OTHER PUBLICATIONS

Great Britain search report dated May 14, 2018, issued in GB Patent Application No. 1807774.3.
Yin et al., "Performance analysis of an aero engine with inter-stage turbine burner", Aeronautical Journal, 2017, 121. pp. 1605-1626.
Extended European Search Report from counterpart EP Application No. 19171413.8 dated Oct. 7, 2019, 8 pgs.
Response to Extended European Search Report from counterpart EP Application No. 19171413.8 dated Oct. 7, 2019, filed Jan. 17, 2020, 32 pgs.

* cited by examiner

HYBRID AIRCRAFT PROPULSION SYSTEM

CROSS-REFERENCE TO RELATED APPLICATIONS

This application is based upon and claims the benefit of priority from British Patent Application Number 1807774.3 filed 14 May 2018, the entire contents of which are incorporated by reference.

BACKGROUND

Technical Field

The present disclosure concerns a propulsion system for a hybrid electric aircraft, and an aircraft comprising the propulsion system.

Description of Related Art

Traditionally, aircraft have been propelled by one or more propulsors such as fans or propellers driven by internal combustion engines such as gas turbine engines or piston engines. Conventionally, the propulsor is driven by a direct drive shaft, or a reduction gearbox.

It has been proposed to replace or augment the power provided by the mechanically driven propulsive fan by one or more electrically driven fans located remotely from the internal combustion engine. Such a system is known as a "hybrid propulsion system". In such a system, the electrically driven fan would be powered by an internal combustion engine driven electrical generator. Advantages of such a system include the ability to provide additional control by providing propulsors in different locations, in addition to gains in propulsive efficiency, and a reduction in drag.

"A synergistic glance at the prospects of distributed propulsion technology and the electric aircraft concept for future unmanned air vehicles and commercial/military aviation" by Amir S Gohardani discloses a number of distributed aircraft propulsion concepts, including Boundary Layer Ingestion (BLI) as well as powered lift concepts.

Such concepts may allow for significantly more efficient aircraft. However, relatively little research has been conducted into how to integrate gas turbine engine cycles for use in such concepts, in order to gain the greatest overall system efficiency.

SUMMARY

According to a first aspect there is provided a hybrid aircraft propulsion system comprising:
a gas turbine engine comprising a compressor, a combustor, one or more turbines, a shaft coupled to one of the turbines, and a bypass fan mechanically driven by the shaft;
an electrical generator mechanically coupled to the shaft;
an auxiliary propulsor mechanically coupled to an electric motor, and electrically coupled to the electric generator;
wherein, at maximum power, the gas turbine engine is configured to produce a turbine entry temperature between 1800 Kelvin and 2000 Kelvin, the engine comprises a fan bypass ratio of between 4:1 and 13:1, and the generator is configured to absorb between 10% and 60% of the mechanical power generated by the turbine.

It has been found that a gas turbine engine having a relatively high turbine entry temperature and a relatively low fan bypass ratio in a hybrid aircraft results in a high overall aircraft system level efficiency.

The fan may have a fan tip pressure ratio at maximum power of between 1.1 and 1.4.

The fan drive turbine may have a pressure ratio that is greater than about 5.

The fan may have a fan bypass ratio of between 5:1 and 10:1.

A ratio of the fan (bypass ratio to the turbine pressure ratio may be between 1 and 2.

The fan may be coupled to the turbine such that the fan and turbine rotate at the same rotational speed in use.

The auxiliary propulsor may be configured to ingest boundary layer airflow in flight.

The gas turbine engine may comprise a low pressure turbine, a high pressure turbine, a low pressure compressor and a high pressure compressor. The low pressure turbine may be coupled to the low pressure compressor, the generator and the fan by a low pressure shaft, and the high pressure turbine may be coupled to the high pressure compressor by a high pressure shaft.

According to a second aspect of the disclosure, there is provided an aircraft comprising a propulsion system according to the first aspect.

The auxiliary propulsor may be located such that an inlet is located adjacent an aft region of the aircraft, and may comprise an outlet adjacent an aft portion of the aircraft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
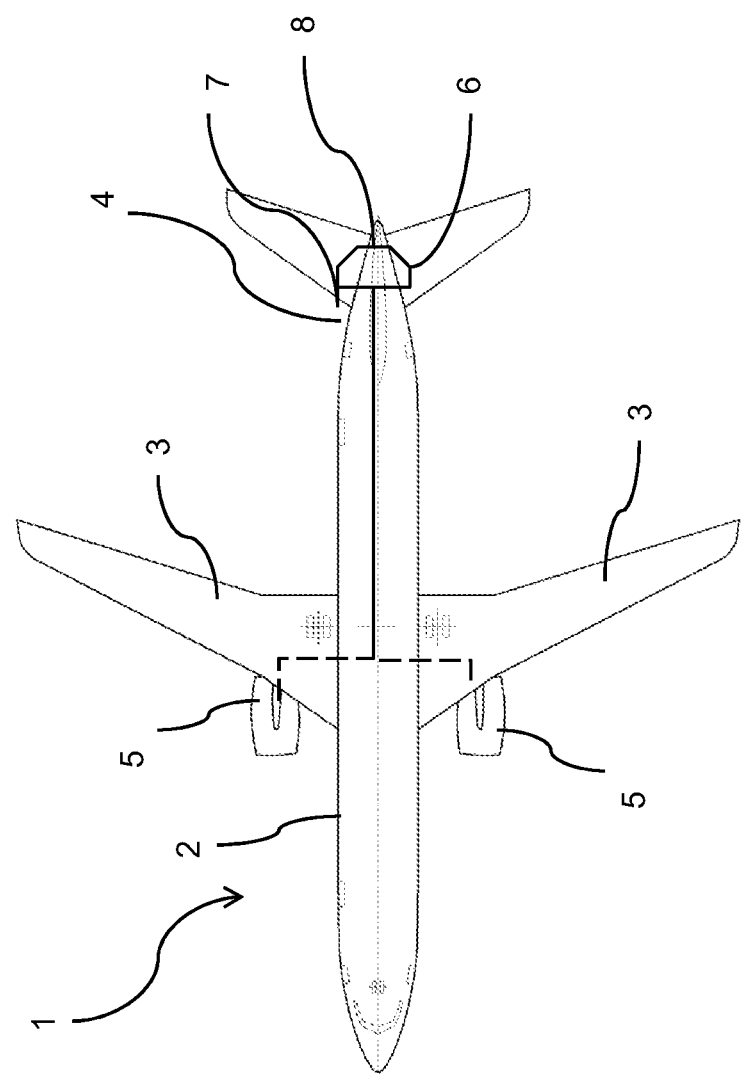
FIG. 1 is a schematic view from above of an aircraft in accordance with the present disclosure.

With reference to FIG. 1, an aircraft 1 is shown. The aircraft comprises a fuselage 2, wings 3, an empennage 4 at an aft portion of the aircraft 1 and a propulsion system.

The propulsion system comprises a pair of gas turbine engines 5, with one being provided on each wing 3. Each gas turbine engine comprises a mechanically driven fan 10 (shown in FIG. 2). The propulsion system further comprises an auxiliary propulsor in the form of a ducted Goldschmied propulsor 6 located adjacent the empennage 4.

The Goldschmied propulsor comprises a ducted fan 6 having an inlet 7 configured to ingest boundary layer air. Boundary layer air is air adjacent an external surface of an aircraft having a velocity in the frame of reference of the aircraft less than 99% of the freestream velocity. Consequently, the inlet 7 is provided close to the external surface of the fuselage 2 adjacent the empennage 4, approximately at the longitudinal position of a leading edge of the horizontal tail surface of the empennage 4 in this embodiment.

Similarly, the Goldschmied propulsor 6 comprises an outlet 8 downstream of the inlet 7, adjacent the aft trailing edge of the aircraft fuselage 2. Consequently, the Goldschmied propulsor 6 has an increased propulsive efficiency in view of its ingestion of slow moving, boundary layer air, and also serves to reduce drag by filling in the wake of the aircraft in flight.

Figure 2:
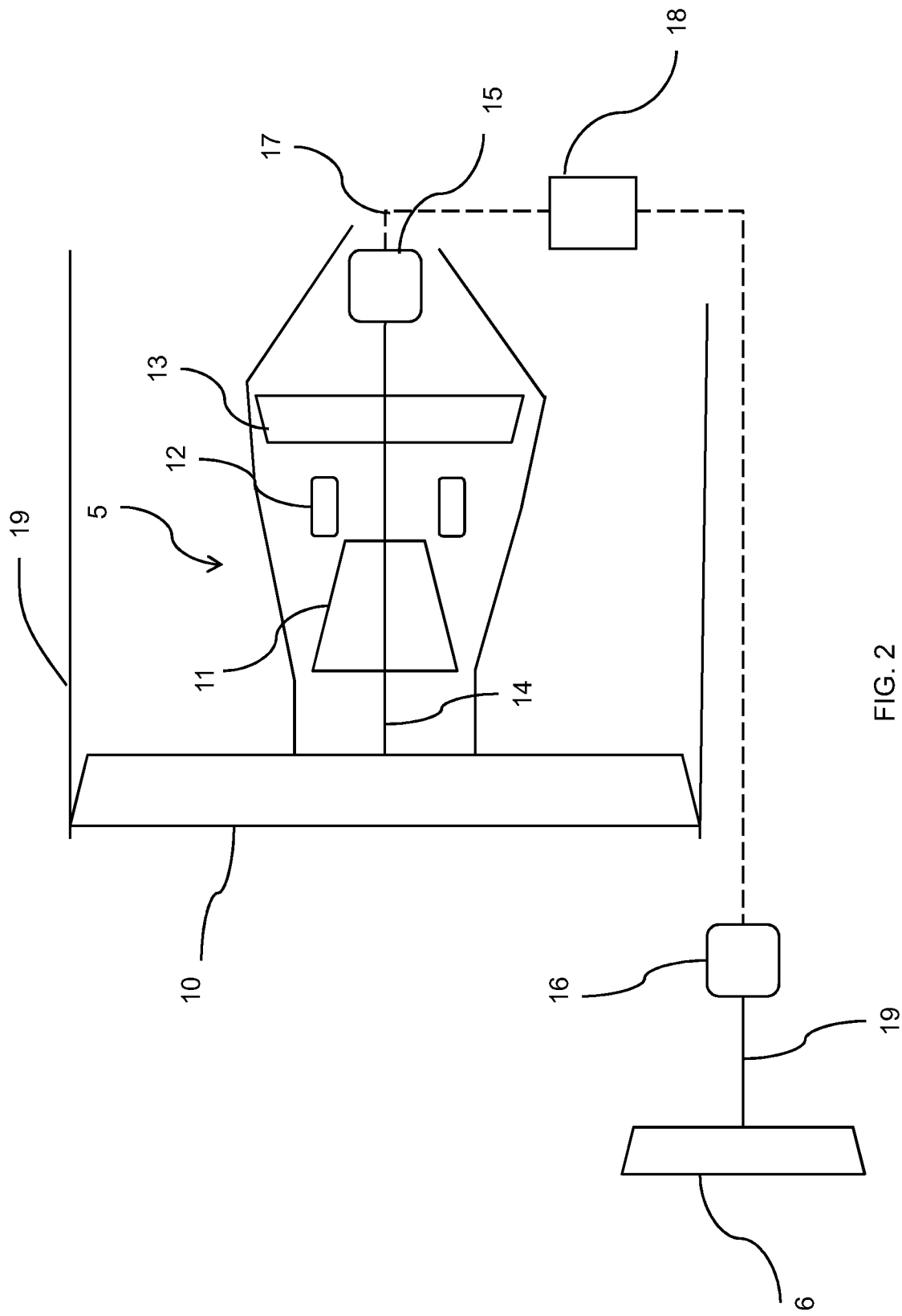
FIG. 2 is a schematic view of a propulsion system of the aircraft of FIG. 1.

One of the gas turbine engines 5 is shown in more detail in FIG. 2, along with the auxiliary propulsor 6. It will be understood that the relative positions and sizes of the components is not necessarily representative of the real system.

The gas turbine engines 5 each comprise a mechanically driven propulsor. In this embodiment, the mechanically driven propulsor is in the form of a ducted fan 10. The ducted fan 10 is provided within a bypass duct 19. Each gas turbine engine 5 further comprises an engine core comprising a compressor 11, combustor 12 and turbine 13 in flow series. The compressor 11 and turbine 13 rotate about a mutual axis, and are coupled by an interconnecting shaft 14, which is also coupled to an electrical generator 15, and to the fan 10, to thereby drive both the generator 15 and the fan 10.

The generator 15 is electrically coupled to an electric motor 16 via an electrical interconnector 17. The electric motor 16 and generator 15 could be of any suitable type, such as permanent magnet DC, and alternating current brushless. Consequently, the interconnector 17 could carry either AC or DC current. Optionally, a power electronics module 18 is provided, which may comprise a rectifier to convert AC power from the generator 15 to DC power for the motor 16, or an inverter to convert DC power from the generator 15 to AC power for the motor 16. A combination of devices may be provided to control the voltage, current and frequency of the power. Electrical storage devices such as batteries may also be provided.

The electric motor 16 is mechanically coupled to the auxiliary fan 6 by a drive shaft 19, to thereby drive the auxiliary fan 6.

The propulsion system may be operated in the following manner. Air is provided to the gas turbine engine 5 through an intake (not shown). This air is compressed by the compressor 11, combusted with fuel in the combustor 12 to produce hot combustion gasses, and expanded in the turbine 13 to rotate the shaft 14, compressor 11, generator 15 and fan 10. Rotation of the generator 15 produces electrical power. This electrical power is provided to the 16 via the electrical interconnector 17 and power electronics module 18, which thereby drives the auxiliary propulsor 6.

The gas turbine engine is optimised to efficiently provide both mechanical power for the fan 10, and electrical power for the auxiliary propulsor 6, as well as other electrical loads. In the below examples, the engine parameters are given as relative to the engine operated at maximum certified static takeoff power at standard sea level conditions. This may be defined by the maximum power at which one or more "redline" conditions is met but not exceeded. For example, one redline condition is turbine entry temperature (TET). Another redline condition may be a shaft 14 rotational speed.

The generator 15 is sized to absorb between 10% and 60% of the mechanical power generated by the fan drive turbine 13. For example, in a fan drive turbine configured to produce 1 megawatt (MW) at maximum power at sea level conditions, the generator is configured to absorb between 100 and xxx kilowatts (KW). A proportion of the power absorbed by the generator 15 will be converted into electrical power, with the remainder being converted to heat. For the above example, in the case of a 90% efficient electrical generator 15, where the electrical generator absorbs 100 KW, 90 KW will be converted to electrical power, with 10 KW being converted to heat. The remainder of the mechanical power will be split between the fan 10 and the compressor 11.

Typically, the compressor absorbs between 30% and 60% of the power generated by the fan drive turbine. The remainder of the power is used to drive the fan 10.

The compressor 11, combustor 12 and turbine 13 are configured to provide a turbine entry temperature (TET) of between 1800 Kelvin (K) and 2000 K at maximum engine power. Methods of controlling TET are well known to the skilled person. For example, TET can be increased by utilising a compressor 11 having a higher compression ratio. Similarly, TET can be raised by providing additional fuel to the combustor 12. On the other hand, TET can be reduced by providing cooling flow (such as internal or effusion air cooling) to the combustor 12 and/or turbine 13.

The fan 10 has a bypass ratio defined by the ratio of air mass flow flowing exclusively through the fan duct 19 to the mass flow of air flowing through the engine core (i.e. into the compressor 11). Again, the bypass ratio can be determined by measuring air mass flow through the bypass duct exclusive of air flow through the engine core, and dividing this by the mass air flow through the engine core at maximum takeoff power conditions (as defined above). In this disclosure, the fan has a bypass ratio of between 1:1 and 13:1. In a specific example, the fan has a bypass ratio of between 5:1 and 10:1.

The fan also defines a fan tip pressure ratio as maximum takeoff power conditions. The fan tip pressure ratio is defined as the total pressure (i.e. the sum of dynamic and static pressure) of the airflow immediately downstream of the fan at the radially outer tip of the fan blades divided by the total pressure immediately upstream of the fan at the same radial position. For example, where the fan is a single stage fan (i.e. with a single rotor stage and a single stator stage downstream of the rotor stage), the fan tip pressure ratio is measured immediately downstream of the fan blade tips. In this disclosure, the fan tip pressure ratio is between 1.1 and 1.4.

The turbine 13 also defines a turbine pressure ratio. The turbine pressure ratio can be defined as the pressure of the gas at the inlet of the turbine 13 (i.e. immediately prior to the first stage of the turbine, which may be a rotor or a stator) divided by the pressure of the gas at the outlet of the turbine (i.e. immediately downstream of the final stage of the turbine, which again may be a rotor or a stator).

In a conventional aircraft gas turbine engine, the design of the fan, combustor, compressor and the turbine are compromised, since the requirements for efficient operation of the fan must be met, while also meeting the requirements for efficient operation of the fan.

Conventionally, increased propulsive efficiency can be provided in several ways. A first way is to increase the thermal efficiency of the engine core (the compressor, combustor and turbine). This can be achieved by raising the turbine inlet temperature. A second way is to increase the propulsive efficiency by increasing the bypass ratio.

Conventionally, engines with high TET also have a fan bypass ratio and/or a high fan tip pressure ratio. This is because, in order for the increased thermal efficiency to be efficiently converted into propulsive thrust, a high thrust fan must be provided. This high thrust fan can either be provided by providing a high bypass, low pressure ratio single stage fan (typically in the region of 15:1 bypass ratios, and fan pressure ratios at around 1.4), or with a faster turning, lower bypass ratio fan, with a higher pressure ratio (typically in the region of 10:1 bypass ratios, and fan pressure ratios at greater than 1.6. Similarly, a much lower bypass ratio (of around 3:1 or lower) can be provided with a multi-stage fan, but with a much higher fan tip pressure ratio (around 2:1 or greater). However, fans having a low bypass ratio, and a low fan tip pressure ratio have not, to our knowledge, been considered in aircraft gas turbine engines having a high TET, since this high TET would not be efficiently translated into additional propulsive thrust.

However, in the present disclosure, a significant proportion (between 10% and 60%) of the additional thermal energy from the core is translated into electrical power by the electrical generator driven by the turbine 13. This electrical power is used to drive an auxiliary fan 6, thereby increasing the propulsive efficiency of the system. Consequently, a highly unorthodox configuration is provided, in which a low fan tip pressure ratio, relatively low bypass fan is combined with a relatively high TET engine core in a hybrid electric gas turbine engine, to provide a system, which has high overall thermal and propulsive efficiency.

Other advantages of the present disclosure are also realised. A limitation for conventional gas turbine engines is the divergent operating requirements of the fan and turbine. Turbines have greater efficiencies where they have relatively high tip speeds. Consequently, in order to have high efficiency (and so reduce the need for additional turbine stages for a given expansion ratio), turbines must either have a large diameter, or turn at a high rate. On the other hand, fans must turn relatively slowly, with fan tip speeds typically being limited to approximately 300 metres per second, to limit efficiency and noise penalties associated with supersonic fan tip speeds. This in turn results in either large, heavy, inefficient slow turning turbines, or relatively low diameter fans, which in turn limits their bypass ratio, and so the propulsive efficiency of the system. One proposed solution to this problem is to incorporate a reduction gearbox in the drivetrain between the turbine and fan to allow for a slow turning fan, and high speed turbine. However, such a gearbox provides additional weight, and may increase cost and reduce reliability.

The present disclosure overcomes this problem. In the present disclosure, a relatively low bypass ratio, relatively low fan tip pressure ratio is combined with a high TET engine core and a generator absorbing between 10% and 60% of the turbine power. In view of the low bypass ratio, low fan tip pressure ratio fan, a relatively high fan rotational rate can be achieved, since the low bypass a ratio results in a smaller diameter, which reduces fan tip speeds, while the low fan pressure ratio increases the critical Mach number, and so increases the speeds at which the fan can rotate before compressibility effects occur. This allows for a fast turning turbine, while avoiding the need for a reduction gearbox. Such a configuration would normally result in low propulsive efficiency—however, the generator and motor driven auxiliary fan absorb the remainder of the power of the turbine to increase the effective bypass ratio, and so increase the propulsive efficiency of the system.

The engine has further parameters of note as a result of this unique configuration. For example, the engine comprises a direct drive bypass fan, and a fan drive turbine having a pressure ratio greater than 5. This is a relatively high ratio, and can be achieved in spite of having between 3 and 6 fan drive turbine stages. This is in part due to the relatively high fan drive turbine rotational speed, which is enabled due to the relatively small diameter fan, and the relatively high proportion of the turbine power that is absorbed by the electric generator.

Figure 3:
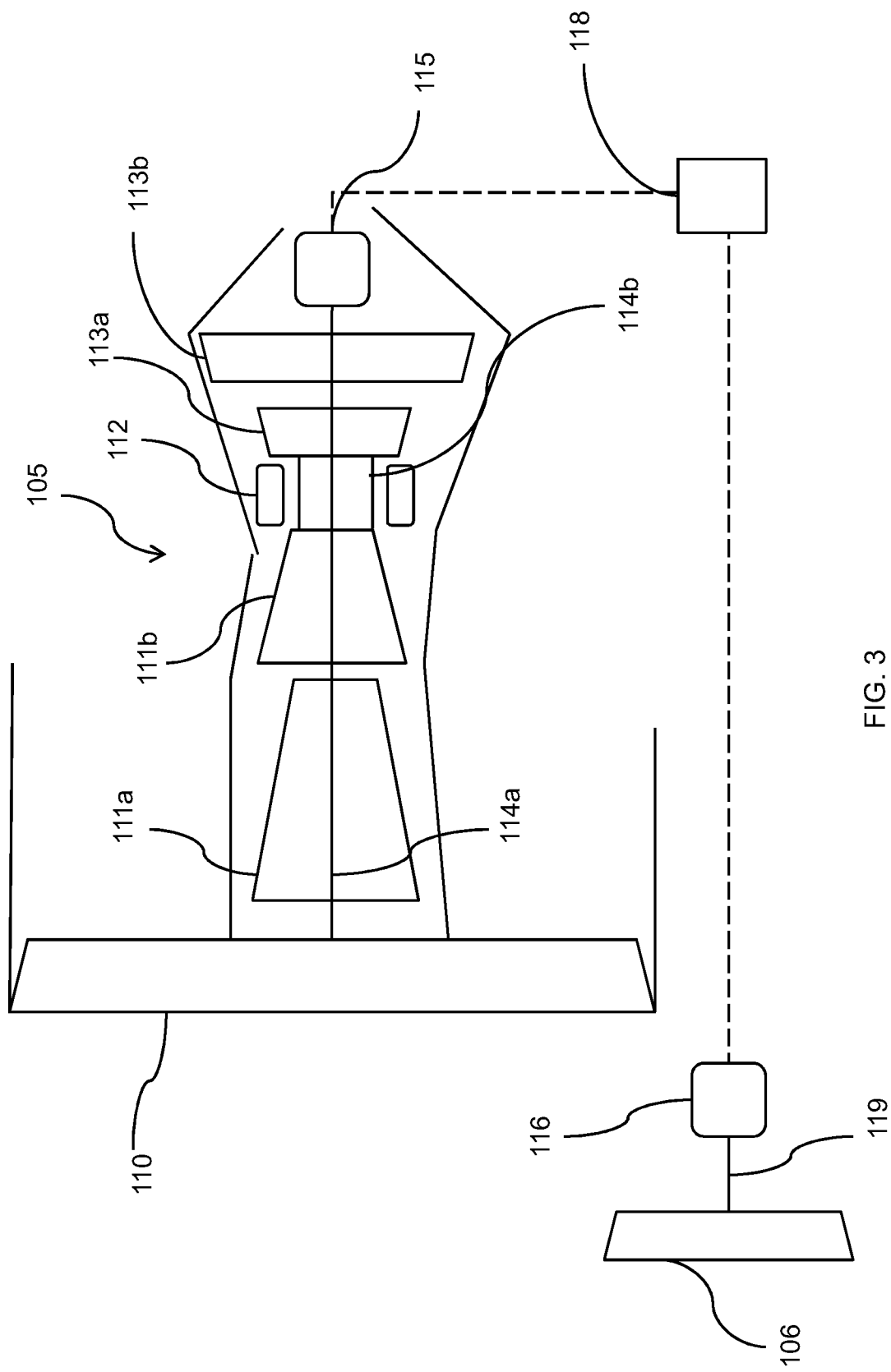
FIG. 3 is a schematic view of an alternative propulsion system of the aircraft of FIG. 1.

FIG. 3 shows an alternative propulsion system for the aircraft 1 of FIG. 1. The propulsion system comprises a gas turbine engine 105 driving a generator 1115 and a fan 110. The system also comprises an auxiliary propulsor 106. The fan 110, generator and auxiliary propulsor 106 are similar to those of the first embodiment. However, the engine core has a different configuration relative to the first embodiment.

The engine 105 comprises a low pressure compressor 111a and a high pressure compressor 111b in flow series. A combustor 112 is provided downstream of the high pressure compressor 111b, followed sequentially by a high pressure turbine 113a and a low pressure turbine 113b. The high pressure turbine 113a is coupled to the high pressure compressor 111b by a high pressure shaft 114b, and the low pressure turbine 113b, low pressure compressor 111a, fan 110 and generator 115 are coupled by a low pressure shaft 114a.

The engine 105 operates similarly to the engine 5, and has similar operational parameters. In this case, the fan 110, generator 115 and low pressure compressor 114a are each driven by the low pressure turbine 113b (which can also be regarded as a "fan drive turbine").

In such a configuration, the turbine entry temperature (TET) of the engine is defined by the temperature of the gasses at the inlet of the high pressure turbine 113a. In other words, regardless of the number of turbines or turbine stages, the TET is also defined as the temperature of the gasses as the reach the first turbine stage following the combustor 112. The TET in this embodiment is the same as that for the first embodiment.

The turbine pressure ratio is defined as the pressure ratio across the low pressure turbine 113b, i.e. the turbine that drives both the fan 110 and the generator 115. Again, the pressure ratio is the same as for the first embodiment.

The fan 110 is similar to that of the first embodiment, and the fan parameters (tip pressure ratio, bypass ratio) are therefore defined in the same way.

Other aircraft to which the present disclosure may be applied may have alternative configurations. By way of example such engines may have an alternative number of interconnecting shafts (e.g. three) and/or an alternative number of compressors and/or turbines. The engine may comprise a gearbox provided in the drive train from a turbine to a compressor and/or fan. The fan and electrical generator may be coupled to separate turbines on separate shafts, such that the electrical generator and fan may rotate at different speeds relatively to one another.

The aircraft could comprise a flying wing or blended wing architecture, in which no distinct fuselage and wings are provided, but rather the body of the aircraft contributes to lift.

Other auxiliary propulsors could be utilised. For example, one or more auxiliary propulsors could be provided on the wing, either forward of the leading edge, or aft of the trailing edge. Auxiliary propulsors could be provided at the wing tips to reduce drag associated with wing tip vortices.

In other cases, the generator is sized to absorb between 10% and 60% of the mechanical power generated by the fan drive turbine. Such ratios have found to be particularly suitable for regional aircraft, having relatively short ranges of around 800 to 1000 nautical miles. In one example, the generator is sized to absorb approximately 20% of the mechanical power generated by the fan drive turbine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A hybrid aircraft propulsion system comprising:
a gas turbine engine comprising a compressor, a combustor, one or more turbines, a shaft coupled to one turbine of the one or more turbines, and a direct drive bypass fan mechanically driven by the shaft;
an electrical generator mechanically coupled to the shaft;
an auxiliary propulsor mechanically coupled to an electric motor, and electrically coupled to the electric generator;
wherein, at maximum power of the gas turbine engine:
the gas turbine engine is configured to produce a turbine entry temperature between 1800 Kelvin and 2000 Kelvin,
the gas turbine engine comprises a fan bypass ratio of between 5:1 and 10:1, and
the generator is configured to absorb between 10% and 60% of mechanical power generated by the one turbine,
wherein the direct drive bypass fan has a fan tip pressure ratio at the maximum power of the gas turbine engine of greater than 1.1 and less than 1.4,
wherein a ratio of the fan bypass ratio to a turbine pressure ratio of the one turbine is between 1 and 2,
wherein the one turbine has a turbine pressure ratio that is greater than 5, and
wherein the one turbine comprises between three stages and six stages, inclusive of three stages and six stages.

2. The system according to claim 1, wherein the direct drive bypass fan is coupled to the one turbine such that the bypass fan and one turbine rotate at the same rotational speed in use.

3. The system according to claim 1, wherein the auxiliary propulsor is configured to ingest a boundary layer airflow in flight.

4. The system according to claim 1, wherein the one turbine comprises a low pressure turbine and the compressor comprises a low pressure compressor, wherein the gas turbine engine further comprises a high pressure compressor and a high pressure turbine.

5. The system according to claim 4, wherein the shaft comprises a low pressure shaft, wherein the low pressure turbine is coupled to the low pressure compressor, the generator and the direct drive bypass fan by the low pressure shaft, and the high pressure turbine is coupled to the high pressure compressor by a high pressure shaft.

6. An aircraft comprising a hybrid aircraft propulsion system according to claim 1.

7. The aircraft according to claim 6, wherein the auxiliary propulsor is located such that an inlet is located adjacent an aft region of the aircraft, and comprises an outlet adjacent an aft portion of the aircraft.

* * * * *